United States Patent
Frach et al.

(10) Patent No.: US 8,591,102 B2
(45) Date of Patent: Nov. 26, 2013

(54) MEASURING DEVICE FOR A HEAT EXCHANGER

(75) Inventors: Manfred Frach, Wesel (DE); Bernd Mussmann, Rheinberg (DE)

(73) Assignee: Clyde Bergemann GmbH Machinen-und Apparatebau, Wesel (DE)

(*) Notice: Subject to any disclaimer, the term of this patent is extended or adjusted under 35 U.S.C. 154(b) by 0 days.

(21) Appl. No.: 13/202,185

(22) PCT Filed: Jan. 27, 2010

(86) PCT No.: PCT/EP2010/050915
§ 371 (c)(1),
(2), (4) Date: Nov. 30, 2011

(87) PCT Pub. No.: WO2010/094537
PCT Pub. Date: Aug. 26, 2010

(65) Prior Publication Data
US 2012/0067542 A1   Mar. 22, 2012

(30) Foreign Application Priority Data
Feb. 19, 2009  (DE) .................. 10 2009 009 592

(51) Int. Cl.
G01K 17/00  (2006.01)
G01K 13/00  (2006.01)
G01K 3/00   (2006.01)
G01K 7/00   (2006.01)

(52) U.S. Cl.
USPC ............. 374/29; 374/141; 374/112; 374/147; 374/166

(58) Field of Classification Search
USPC ................. 374/29, 141, 112, 147, 166
See application file for complete search history.

(56) References Cited

U.S. PATENT DOCUMENTS

| | | | |
|---|---|---|---|
| 3,276,437 A   | 10/1966 | Jonakin et al. | |
| 3,724,267 A * | 4/1973  | Zoschak ................ | 374/30 |
| 4,415,279 A * | 11/1983 | Beuse et al. .......... | 374/204 |
| 4,488,516 A   | 12/1984 | Bueters et al. | |
| 4,527,908 A   | 7/1985  | Arisi | |
| 4,595,297 A * | 6/1986  | Liu et al. ............ | 374/29 |
| 4,607,961 A * | 8/1986  | Wynnyckyj et al. ..... | 374/30 |
| 4,779,994 A * | 10/1988 | Diller et al. ......... | 374/29 |

(Continued)

FOREIGN PATENT DOCUMENTS

EP  1760441 A1    3/2007
WO  2004036116 A2  4/2004

OTHER PUBLICATIONS

"Identification of local heat flux to membrane water-walls in steam boilers" Taler et al Fuel 88(2009) 305-311.*

(Continued)

*Primary Examiner* — Mirellys Jagan
(74) *Attorney, Agent, or Firm* — BainwoodHuang

(57) ABSTRACT

A measuring device for a heat exchanger includes a pressure pipe arrangement that is spaced using webs and that has a heating side and an isolation side and that is implemented with at least one heat flow sensor. A heat flow sensor is arranged on the heating side in such a way that at least two temperatures $T_1$ and $T_2$ and the temperature difference thereof can be detected there, and additionally at least one temperature sensor for measuring a temperature $T_3$ is arranged on the isolation side and at a distance to the heat flow sensor.

10 Claims, 3 Drawing Sheets

(56) References Cited

U.S. PATENT DOCUMENTS

| | | | |
|---|---|---|---|
| 6,485,174 B1 * | 11/2002 | Albrecht et al. | 374/29 |
| 6,848,373 B2 | 2/2005 | Breen et al. | |
| 7,249,885 B2 * | 7/2007 | Van Den Ende et al. | 374/147 |
| 2004/0163969 A1 | 8/2004 | Breen et al. | |

OTHER PUBLICATIONS

S.B.H.C. Neal et al., "The Measurement of Radiant Heat Flux in Large Boiler Furnances—II. Development of Flux Measuring Instruments", XP001188101, revised Jan. 9, 1980, vol. 23, pp. 1023-1031.

* cited by examiner

MEASURING DEVICE FOR A HEAT EXCHANGER

BACKGROUND

The present invention relates to a measuring device for a heat exchanger which has a pressure tube arrangement spaced apart by bars and having a combustion side and an isolation side. The invention also relates to a method for determining heat flows at a pressure tube arrangement, a heat exchanger having a measuring device, and the use of a measuring device for measuring the heat flow.

It is known in the prior art for the pressure tube arrangements, which as a rule form integral parts of heat exchangers or heat exchanger walls, to be monitored with regard to the heat flux taking place therein. Thus, for example, a heat flux measuring device for pressure tubes and a method for measuring a heat flux through pressure tubes is known from WO 2004/036116 A2. The heat flux sensors described therein are formed as an integral part of the pressure tubes. On account of the high costs, however, it is desirable in practice to reduce the number of heat flux sensors required. As a result, however, gaps in the monitoring of the heat flux at the pressure tube arrangements could arise, and so deposits possibly occurring in these gaps cannot be recognized in good time and removed.

SUMMARY

The object of the present invention is therefore to at least partly solve the problems arising from the prior art and to provide in particular improved detection of the heat flows at pressure tube arrangements, it being possible to maintain or even reduce the number of requisite heat flow sensors compared with known devices.

These objects are achieved by a measuring device and by a method. Advantageous developments are disclosed herein. It should be noted that features individually herein can be combined with one another in any desired, technologically appropriate manner and show further configurations of the invention. The description, in particular in connection with the figures, explains the invention and indicates additional example embodiments.

To achieve this object, the measuring device according to the invention for a heat exchanger is designed in such a way that the heat exchanger has a pressure tube arrangement spaced apart by bars and having a combustion side and an isolation side and is embodied with at least one heat flow sensor. The heat flow sensor is arranged on the combustion side in such a way that at least two temperatures $T_1$ and $T_2$ and the temperature difference thereof can be determined there. Furthermore, at least one temperature sensor for measuring a temperature $T_3$ is additionally arranged on the isolation side and at a distance from the heat flow sensor.

The present invention has recognized that it is already sufficient to use, in addition to the heat flow sensors, additional temperature sensors for determining the temperature $T_3$ in the vicinity of the heat flow sensor. By means of these temperature sensors arranged at a distance from the heat flow sensor, a further heat flow between the additional temperature sensor and a further point of known temperature can be determined. Such points are, for example, the locations at which the temperature sensors of the heat flow sensor are arranged. A very particular point of known temperature, however, can also be found on the inner side of the pressure tubes. There, as the invention has established, approximately the same temperature prevails on the entire tube inner side. This temperature corresponds, with only very slight deviations, to the temperature of the steam flow passing through therein. The inner temperature of the pressure tubes is, to the greatest extent, independent of a combustion-side or isolation-side spatial position within the pressure tube. Here, the combustion side is the side of the pressure tube arrangement that faces a combustion chamber and the isolation side is the side of the pressure tube arrangement that faces away from the combustion. The knowledge that the surface temperature of the entire inner side of the pressure tubes is now approximately the same is utilized by the invention in order to determine a heat flow between the location of the temperature sensor which measures the temperature $T_3$ and a nearest point on the inner side of a pressure tube. In effect, this makes it possible to determine two different heat flows by means of a heat flow sensor and only one additional temperature sensor. As a result, compared with the hitherto conventional arrangement of two heat flow sensors, considerable costs can be saved and at the same time improved monitoring of the pressure tube arrangement with regard to, for example, deposits, damage or contaminants, which are in each case reflected in altered heat flows, can be realized.

In addition, it is advantageous for the service life and the loading of the temperature sensors used if the at least one additional temperature sensor is arranged on the isolation side of the pressure tube arrangement. As a result, the thermal loading and the effect of the combustion on the relatively sensitive temperature sensors is markedly reduced, and so said temperature sensors can be embodied more favorably and at the same time achieve a longer service life.

It is preferred that a plurality of temperature sensors are assigned to one/each heat flow sensor, preferably at a distance of not greater than 10 meters, in particular 2 meters.

Here, a heat flow sensor refers in particular to a measuring sensor in which at least two thermocouples are either placed on the surface of a pressure tube or inserted into a thickened line. In one embodiment variant, a thermocouple is embedded in a local concavity of the pressure tube. Especially preferred is the construction according to WO 2004/036116 A2, to which reference is made in its entirety in this respect. In addition, the following embodiment is preferred:
Sensors: 4 thermocouples (redundant embodiment)
Measuring accuracy: +/−2%
Measuring range: 0 to $0.4 \times 106$ W/m$^2$ [watts/square meter]
Output signal: mV [millivolts]
Calibration: individually calibrated in V/Wm$^2$ [volts/watts and square meters]

A temperature sensor refers in particular to an individual (semiconductor) sensor (e.g. with constant Pt characteristic), in particular like a PTC or NTC. At least 4 temperature sensors are preferably assigned to one heat flow sensor.

In an especially preferred development of the invention, a plurality of temperature sensors around the heat flow sensor form a line, a curve or a grid on the pressure tube arrangement. For example, if one temperature sensor is arranged above the heat flow sensor and another is arranged below the heat flow sensor, said temperature sensors define a line or a curve. The two temperature sensors and the heat flow sensor in this case lie on the curve or line. Alternatively, however, the temperature sensors could also be arranged in a circular curve around the heat flow sensor. In addition to a circular path, any desired geometrical curve shape is also conceivable. It is especially preferred if a plurality of temperature sensors form a grid on the pressure tube arrangement, within which grid the heat flow sensor lies. Thus monitoring of the heat flows in the pressure tube arrangement over a relatively large surface area can be realized by means of a few additional temperature sensors.

It has proved to be favorable if the at least one temperature sensor is arranged on a bar of the pressure tube arrangement. In pressure tube arrangements, the bars serve to connect the pressure tubes and form together with the pressure tubes a heat exchanger wall. If the temperature sensors are now arranged on the bar, the heat flow between the location of the temperature sensor on the bar and the point of the pressure tube inner side nearest thereto can be calculated very accurately. It is in particular advantageous in this case if the temperature sensor is arranged equidistantly to two adjacent pressure tubes, since it is thereby suitable, for example, for simultaneous measurements at two adjacent pressure tubes, each having a heat flow sensor. Furthermore, the adjacent heat flows thus determined can be checked for their plausibility in an especially effective manner by a subsequent comparison of the measured values.

Finally, it is advantageous for the measuring device if the at least one temperature sensor and the at least one heat flow sensor are connected to an evaluating device. Such an evaluating device can be, for example, a programmable computer which evaluates the determined temperatures according to a preset program. In particular, cleaning devices which carry out cleaning measures in the event of contaminants and deposits being found on the pressure tube arrangements of the heat exchangers can be controlled as a result of the evaluation.

The data obtained by means of the measuring device and evaluated serve in particular to operate at least one cleaning system in the interior of the heat exchanger through which flue gas flows, such that the combustion side of the heat exchanger can be freed of slag, ash and the like in line with the requirements and in a specific manner during operation. For example, what are referred to as water cannons or soot blowers, as are offered by the applicant, can be used for this purpose.

The abovementioned objects are likewise achieved by a method for determining heat fluxes at a pressure tube arrangement using a measuring device, comprising the steps:

a) detecting a first heat flow $Q_1$ by measuring a first temperature $T_1$ and a second temperature $T_2$ by means of a heat flow sensor;
b) measuring at least one third temperature $T_3$ by at least one further temperature sensor; and
c) determining a second heat flow $Q_2$ by means of the measured temperatures $T_1, T_2, T_3$ and known steam parameters of the steam flowing through the pressure tube.

With the method according to the invention, it is possible, with the aid of a small number of measured variables, which in addition can be determined in a simple and inexpensive manner, to determine additional heat flows at the pressure tube arrangement.

It is preferred in this connection that the second heat flow $Q_2$ is calculated.

With this method, with reduced outlay in terms of apparatus, redundant data can nonetheless be obtained over a large region of the thermal plant and used for the operation and/or cleaning thereof.

In an especially preferred embodiment of the invention, a distribution of the heat flow along a line, a curve or over a grid is determined from a plurality of determined temperatures which have been measured at a distance from the heat flow sensor. As a result, with the few means shown, the heat flows can be detected over a large surface area, which would otherwise require a multiplicity of heat flow sensors.

In a further advantageous design of the method according to the invention, a heat flow in the vicinity of at least one heat flow sensor is determined by means of the evaluating device, the evaluating device utilizing at least one temperature $T_3$, measured by the at least one temperature sensor, for calculating the second heat flow. To this end, the evaluating device can be, for example, a computer which is suitable for executing programs. By means of such a program, at least one further heat flow, in addition to the heat flow determined by the heat flow sensor, can be calculated from said measured values. Furthermore, the evaluating device can also calculate a plurality of additional heat flows and can then be used for determining a distribution of the determined heat flows over a surface area, such that, for instance, a graphic distribution of the heat flows can be displayed. Furthermore, the information additionally obtained can be evaluated in the evaluating device.

Contamination states can be determined in each case from the time characteristic of the heat flows $Q_1$ and $Q_2$ to $Q_n$. Depending on the contamination state, the use of "online cleaning devices" (rapping devices, soot blowers, hose systems, cannons, etc.) and/or the cleaning patterns of the water cannons can be activated even more selectively. That is to say that a greater resolution of cleaning patterns is possible and more specific activation of the on-load cleaning devices is possible with the additional measured heat flows and temperature information. For example, the water cannon patterns may be mentioned here. This is because the additional information can help to vary the cleaning parameters within a cleaning pattern. In particular, the first part of a cleaning pattern could be cleaned with intensive cleaning parameters, since the characteristic of the heat flow $Q_1$ indicates a very pronounced contamination, and the second part of the cleaning pattern could be cleaned with less intensive cleaning parameters, since the characteristic of the heat flow $Q_2$ shows lower contamination.

The heat exchanger having a measuring device as described herein has the advantage that said heat exchanger can be monitored over a large surface area with regard to the heat flows actually occurring by only one heat flow sensor or by a very few heat flow sensors.

In addition, the use of the measuring device according to the invention is advantageous when determining heat fluxes of the pressure tube arrangement of a combustion boiler which permits an especially reliable and long operating cycle of the combustion boiler between two inspections. The combustion boiler can thus be operated with a reduced number of heat flow sensors, since the remaining temperature sensors still provide redundant, reliable and sufficiently accurate determination of heat flows in the pressure tube arrangement, such that, for example, specific cleaning and monitoring of the functioning of the pressure tube arrangement is possible.

The invention and the technical field are explained in more detail below with reference to the figures. Attention is drawn to the fact that the figures show especially preferred embodiment variants of the invention, but the invention is not restricted thereto. In the drawing:

DETAILED DESCRIPTION

Figure 1:
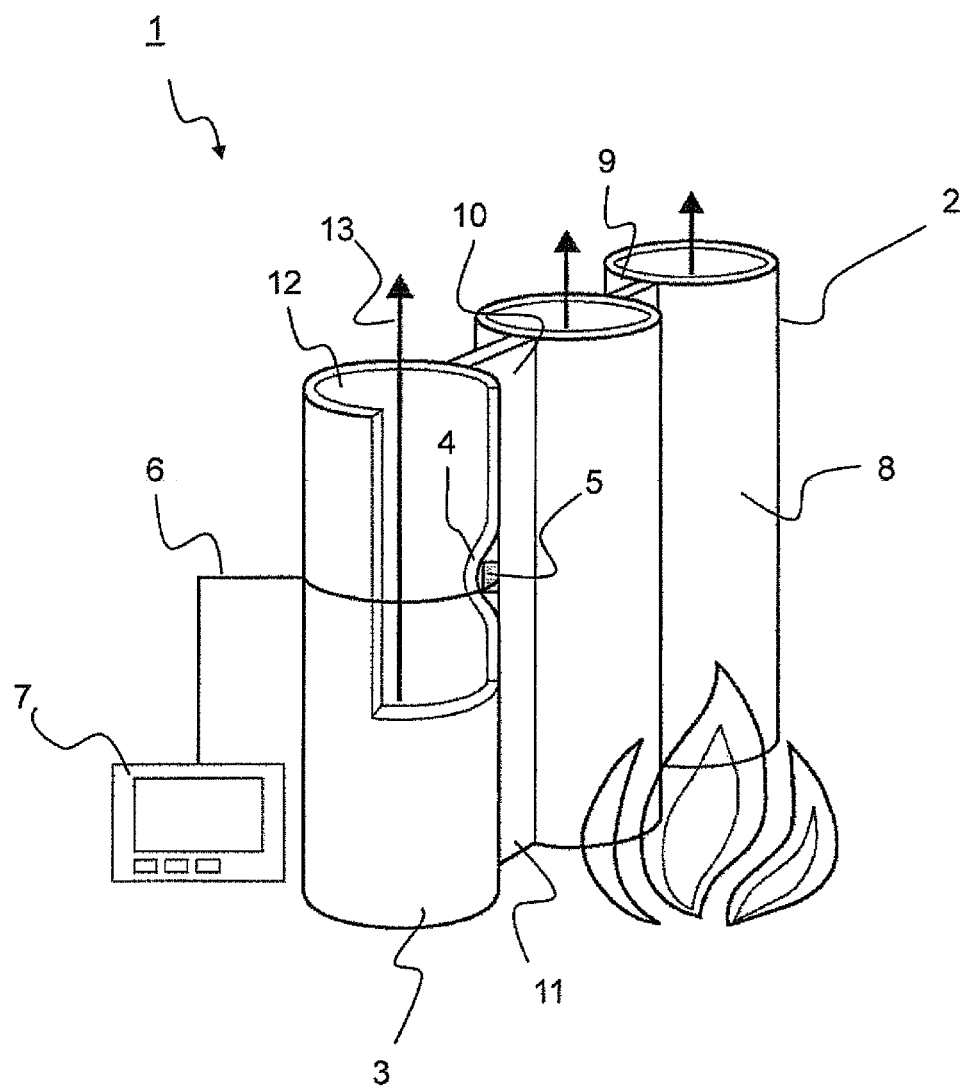
FIG. 1 shows a schematic oblique view of a pressure tube arrangement according to the invention.

A measuring device 1 according to the invention for a heat exchanger 2 is shown in an oblique view in FIG. 1. Here, a first pressure tube 3 is shown in a partly sectioned state, where it can be readily seen that a heat flow sensor is arranged in a corrugation 4 and is connected via a line 6 to an evaluating device 7.

The heat exchanger shown in FIG. 1 has a combustion side 8 and an isolation side 9. The combustion side 8 is that side of the pressure tube arrangement 10 which faces the combustion. In addition to the pressure tubes 3, the pressure tube arrangement 10 consists of bars 11 lying in between. On the inner sides 12 of the pressure tubes 3, steam flows in the direction of the arrows 13 through the pressure tubes 3 and absorbs the heat flows acting on the pressure tube arrangement 10 from the combustion side 8.

Figure 2:
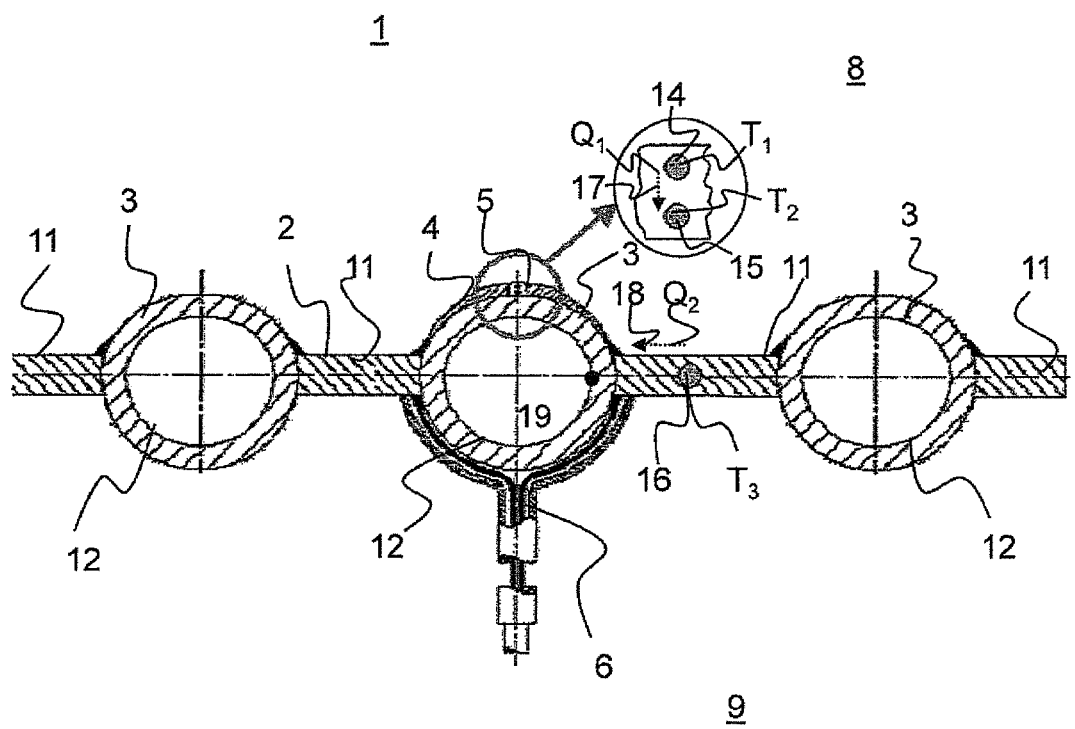
FIG. 2 schematically shows a horizontal sectional view through a pressure tube arrangement according to the invention.

A preferred embodiment of the present invention is now shown in a horizontal sectional view in FIG. 2. The measuring device 1 here again consists of a heat exchanger 2 which comprises the pressure tubes 3 and the bars 11 lying in between. The top region of the drawing shows the combustion side 8 and the bottom region shows the isolation side 9. Arranged in the corrugation 4 of the central pressure tube 3 is a heat flow sensor 5 which comprises two temperature sensors 14, 15. In principle, it should be noted in this case that the heat flow sensor 5 comprises at least two temperature sensors 14, 15, although heat flow sensors having three or more temperature sensors are also perfectly conceivable. In the exemplary embodiment shown, the region of the heat flow sensor 5 is shown again enlarged. It can readily be seen in this enlarged illustration that the heat flow sensor 5 has the first temperature sensor 14 for measuring the temperature $T_1$ and the second temperature sensor 15 for measuring the temperature $T_2$. Furthermore, the measuring device according to the invention has a third temperature sensor 16 which is used for determining a third temperature $T_3$. Since the invention has now recognized that the temperature of the steam flowing through always prevails on the entire inner side 12 of the pressure tubes 3, it is now possible to calculate, in addition to a first heat flow 17, which is designated by $Q_1$, a second heat flow 18, which is designated by $Q_2$, between the third temperature sensor 16 and, for example, the point 19 on the inner side 12 of the pressure tube 3. In the embodiment of the invention shown in FIG. 2, the third temperature sensor 16 is arranged between two bar walls 11 and is thus protected toward both the combustion side 8 and the isolation side 9. In other embodiments of the invention, however, the third temperature sensor 16 can also be arranged directly on the surface of the isolation side 9. Furthermore, line means 6 which connect the heat flow sensor 5 and the temperature sensor 16 to an evaluating device 7 are again provided on the pressure tube 3.

Figure 3:
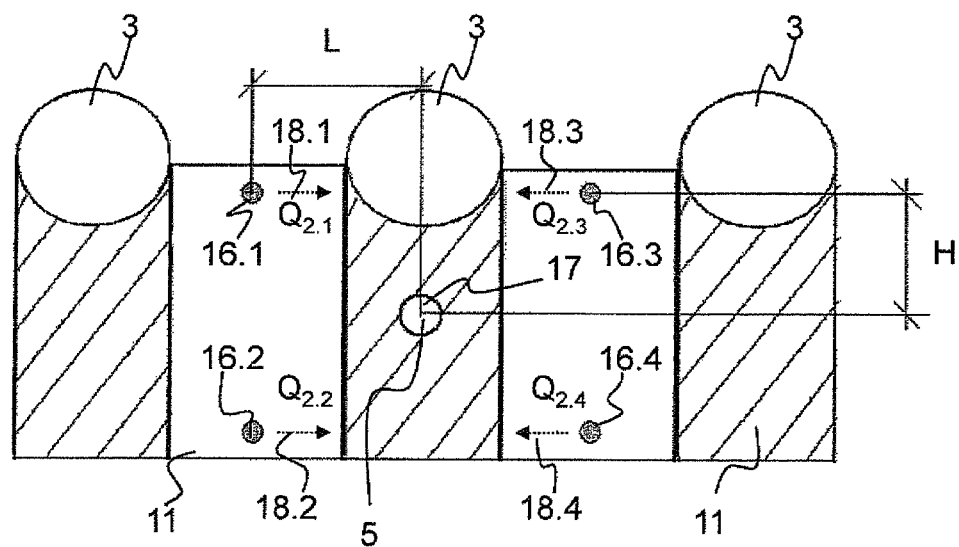
FIG. 3 schematically shows a further oblique view of a pressure tube arrangement according to the invention.

Finally, a view of a further embodiment of a measuring device 1 according to the invention is shown obliquely from above in FIG. 3. The heat flow sensor 5 is arranged on the central pressure tube 3. Around the heat flow sensor, four third temperature sensors 16.1, 16.2, 16.3 and 16.4 define a grid around the heat flow sensor 5. In addition to the first heat flow 17 oriented normal to the drawing plane, a plurality of additional heat flows $Q_{2.1}$, $Q_{2.2}$, $Q_{2.3}$, $Q_{2.4}$ can be determined with this device. It is thereby possible to monitor the heat flows in the pressure tube 3 and the adjacent bars 11 over an area and in a very accurate manner, while at the same time requiring little outlay in terms of the apparatus.

On the whole, therefore, it can be stated that the present invention can bring considerable advantages with only very little technical outlay. Furthermore, the present invention is not restricted to the example embodiments shown. On the contrary, numerous modifications are possible within the scope of the invention. Thus, for example, instead of the geometries and arrangements shown, numerous other geometries and arrangements with which the present invention can be realized can be selected.

LIST OF DESIGNATIONS

1 Measuring device
2 Heat exchanger
3 Pressure tube
4 Corrugation
5 Heat flow sensor
6 Line
7 Evaluating device
8 Combustion side
9 Isolation side
10 Pressure tube arrangement
11 Bar
12 Inner side
13 Arrow
14 First temperature sensor
15 Second temperature sensor
16 Third temperature sensor
17 First heat flow
18 Second heat flow

The invention claimed is:

1. A measuring device for a heat exchanger which has a pressure tube arrangement spaced apart by bars and having a combustion side and an isolation side and is embodied with at least one heat flow sensor, wherein the heat flow sensor is arranged on the combustion side in such a way that at least two temperatures T1 and T2, a temperature difference thereof, and a first heat flow Q1 can be determined there, and at least one temperature sensor for measuring a temperature T3 is additionally arranged on the isolation side and at a distance from the heat flow sensor such that a second heat flow Q2 between the location of the at least one temperature sensor and a nearest point on an inner side of a pressure tube can be determined, wherein the at least one temperature sensor is arranged on a bar of the pressure tube arrangement.

2. The measuring device according to claim 1, wherein a plurality of temperature sensors around the heat flow sensor form a line, a curve or a grid on the pressure tube arrangement.

3. The measuring device according to claim 1, wherein the at least one temperature sensor and the at least one heat flow sensor are connected to an evaluating device.

4. The measuring device according to claim 1, wherein at least one temperature sensor is arranged between two bars.

5. The measuring device according to claim 1, wherein at least one temperature sensor is arranged equidistantly to two adjacent pressure tubes.

6. A method for determining heat flows at a pressure tube arrangement spaced apart by bars using a measuring device, the pressure tube arrangement having a combustion side and an isolation side and being embodied with a heat flow sensor, wherein the heat flow sensor is arranged on the combustion side in such a way that a first temperature T1, a second temperature T2 and a temperature difference thereof can be determined there, and a temperature sensor for measuring a third temperature T3 is additionally arranged on the isolation side and at a distance from the heat flow sensor, the method, comprising:

a) detecting a first heat flow Q1 by determining the temperature difference of the first temperature T1 and the second temperature T2 by means of the heat flow sensor being arranged on the pressure tube arrangement;

b) measuring the third temperature T3 by means of the temperature sensor being arranged on a bar; and c) determining a second heat flow Q2 by means of the measured temperature T3 and known steam parameters of steam flowing through the pressure tube arrangement.

7. The method as claimed in claim 6, wherein a distribution of the heat flow along a line, a curve or over a grid is determined from a plurality of determined temperatures which have been measured at a distance from the heat flow sensor.

8. The method as claimed in claim 6, wherein the second heat flow Q2 is determined by means of an evaluating device, the evaluating device utilizing the third temperature T3, measured by the temperature sensor, for calculating the second heat flow Q2.

9. The method as claimed in claim 6, wherein the temperature sensor is used to simultaneously measure heat flows between the temperature sensor and two adjacent pressure tubes.

10. A heat exchanger, comprising:

a measuring device which has a pressure tube arrangement spaced apart by bars and having a combustion side and an isolation side and being embodied with a heat flow sensor, wherein the heat flow sensor is arranged on the combustion side in such a way that a first temperature T1, a second temperature T2 and a temperature difference thereof can be determined there, and a temperature sensor for measuring a third temperature T3 is additionally arranged on the isolation side and at a distance from the heat flow sensor; and an evaluating device which is set up for carrying out a method which includes:

a) detecting a first heat flow Q1 by determining the temperature difference of the first temperature T1 and the second temperature T2 by means of the heat flow sensor, b) measuring the third temperature T3 by means of the temperature sensor, and c) determining a second heat flow Q2 by means of the measured temperature T3 and known steam parameters of steam flowing through the pressure tube arrangement, wherein the temperature sensor is arranged on a bar of the pressure tube arrangement.

* * * * *

UNITED STATES PATENT AND TRADEMARK OFFICE
CERTIFICATE OF CORRECTION

PATENT NO. : 8,591,102 B2  
APPLICATION NO. : 13/202185  
DATED : November 26, 2013  
INVENTOR(S) : Manfred Frach and Bernd Mussmann Page 1 of 1

It is certified that error appears in the above-identified patent and that said Letters Patent is hereby corrected as shown below:

Title page, listed under:
"item (73) Assignee: Clyde Bergemann GmbH Machinen-Und Apparatebau, Wesel, Germany"
-- should read --
-- item (73) Assignee: Clyde Bergemann GmbH Maschinen-Und Apparatebau, Wesel, Germany --

Signed and Sealed this  
Sixth Day of May, 2014

Michelle K. Lee  
*Deputy Director of the United States Patent and Trademark Office*